United States Patent [19]

Hoover et al.

[11] Patent Number: 5,455,310

[45] Date of Patent: Oct. 3, 1995

[54] COMPOSITIONS OF SILOXANE POLYCARBONATE BLOCK COPOLYMERS AND HIGH HEAT POLYCARBONATES

[75] Inventors: James F. Hoover; Paul D. Sybert, both of Evansville, Ind.

[73] Assignee: General Electric Company, Pittsfield, Mass.

[21] Appl. No.: 290,453

[22] Filed: Aug. 15, 1994

Related U.S. Application Data

[63] Continuation of Ser. No. 89,866, Jul. 9, 1993, abandoned.

[51] Int. Cl.⁶ .......................... C08L 69/00; C08L 67/02; C08L 83/10; C08G 77/448
[52] U.S. Cl. .................. 525/431; 525/425; 525/433; 525/439; 525/464; 525/467; 525/469
[58] Field of Search .................... 525/431, 433, 525/439, 425, 464, 467, 469

[56] References Cited

U.S. PATENT DOCUMENTS

| | | | |
|---|---|---|---|
| 3,028,365 | 4/1962 | Schnell et al. | |
| 3,030,331 | 4/1962 | Goldberg. | |
| 3,036,036 | 5/1962 | Howe | 528/204 |
| 3,169,121 | 2/1965 | Goldberg. | |
| 3,189,662 | 6/1965 | Vaughn, Jr. | |
| 3,275,601 | 9/1966 | Schnell et al. | |
| 3,334,154 | 8/1967 | Kim. | |
| 3,419,635 | 12/1968 | Vaughn, Jr. | |
| 3,832,419 | 8/1974 | Merritt, Jr. | |
| 3,915,926 | 10/1975 | Wambach. | |
| 4,134,936 | 1/1979 | Byrne | 528/201 |
| 4,167,536 | 9/1979 | Factor | 528/27 |
| 4,188,314 | 2/1980 | Fox et al. | |
| 4,210,741 | 7/1980 | Baggett | 528/202 |
| 4,681,922 | 7/1987 | Schmidt et al. | 525/474 |
| 4,994,532 | 2/1991 | Hawkins et al. | 525/464 |
| 5,344,910 | 9/1994 | Sybert | 528/203 |

FOREIGN PATENT DOCUMENTS

| | | | |
|---|---|---|---|
| 1141061 | 2/1983 | Canada | 525/464 |
| 0376052 | 7/1990 | European Pat. Off. | |

*Primary Examiner*—David Buttner

[57] ABSTRACT

A thermoplastic composition which comprises a siloxane polycarbonate block copolymer wherein the polysiloxane segments of the copolymer are of the formula:

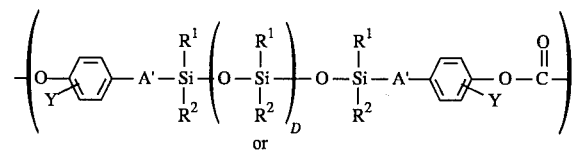

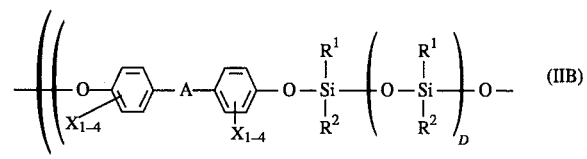

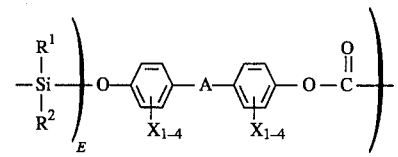

where $R^1$, $R^2$, Y, D, A, X, A' and E are as defined herein, and high heat polycarbonates containing recurring or repeating polycarbonate units of the formula:

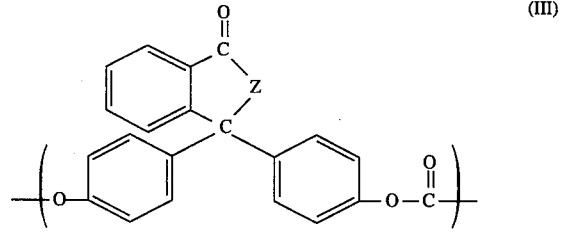

wherein Z is —O—, —N(R³)— or a mixture thereof and $R^3$ is selected from hydrogen, hydrocarbyl and halogen-substituted hydrocarbyl.

11 Claims, No Drawings

COMPOSITIONS OF SILOXANE POLYCARBONATE BLOCK COPOLYMERS AND HIGH HEAT POLYCARBONATES

This is a continuation of application Ser. No. 08/089,866 filed on Jul. 9, 1993, now abandoned.

FIELD OF THE INVENTION

This invention relates to thermoplastic compositions comprising polysiloxane-polycarbonate block copolymers and high heat polycarbonates. These polymer compositions exhibit improved low temperature ductility, improved thick section impact strength, improved resistance to cracking on thermal cycling and improved retention of impact after thermal cycling. The polymer compositions are especially useful as engineering thermoplastics.

BRIEF DESCRIPTION OF THE RELATED ART

Phenolphthalein, as a dihydric phenol reactant, has been used to prepare high heat polycarbonate resins; see for example the disclosures in U.S. Pat. Nos. 3,036,036; 3,036,037; 3,036,039; 4,078,999; 4,167,536; and 4,310,652. Phenolphthalein has also been used as a reactant in admixture with bisphenol-A to prepare copolycarbonate resins; see for example Lin, M. S. and E. M. Pearce, Polymers With Improved Flammability Characteristics, II: Phenolphthalein Related Copolycarbonates, Journal of Polymer Science: Polymer Chemistry Edition, (1981) 19: p. 2151–2160. Poly-(ester-carbonates) prepared with phenolphthalein reactant are also known; see U.S. Pat. No. 4,310,652. The phenolphthalein copolycarbonates exhibit good room temperature ductility and high heat-distortion temperatures.

Certain derivatives of phenolphthalein have also been used as dihydric phenols to prepare polycarbonate resins. For example, Lin and Pearce, I: Pgs. 2151–2160, supra., describe preparation of polycarbonate homopolymer resins wherein 3,3-bis(p-hydroxyphenyl)phthalimidine and 2-phenyl-3,3-bis(p-hydroxyphenyl)phthalimidine were separately polymerized (phosgenated).

A application, Ser. No. 08/035,843, filed, Mar. 23, 1993, now U.S. Pat. No. 5,344,90 discloses selected phenolphthalimidine homo and copolycarbonates that have better UV stability than phenolphthalein copolycarbonates. These phenolphthalimidine homo and copolycarbonates also have good room temperature ductility, high heat distortion temperatures and are free from the objectionable coloration associated with the above mentioned phenolphthalein monomer.

These phenolphthalein and phenolphthalimidine homo and copolycarbonates have several disadvantages that limit their usefulness. Particularly the phenolphthalein and phenolphthalimide polycarbonates have poor low temperature ductility and parts molded from these polycarbonates crack on thermal cycling.

Condensation copolymers having polysiloxane and polycarbonate blocks are known. Representative of such polymers are those disclosed by Schmidt et al., U.S. Pat. No. 4,681,922, Vaughn, U.S. Pat. No. 3,189,662, Vaughn, U.S. Pat. No. 3,419,635, and Merritt, U.S. Pat. No. 3,832,419.

A shortcoming of these siloxane-carbonate polymers is inadequate resistance to distortion at elevated temperatures.

Other siloxane-carbonate copolymers, such as described by Vaughn, U.S. Pat. No. 3,419,635, have an elastomeric character and are not considered as engineering thermoplastics, being more useful as adhesives, coatings, sealants, roofing material, impact modifying additives and the like.

An application, Ser. No. 07/724,023, filed Jul. 1, 1991, discloses blends of polycarbonates and siloxane-polycarbonates. These blends have inadequate resistance to distortion at elevated temperatures. In addition, this application does not disclose the use of siloxane-polycarbonate containing blends to improve the stress crack resistance of high heat polycarbonates.

The new polymer compositions of this invention comprise phenolphthalein and/or phenolphthalimide homo and copolycarbonates, commonly referred to as high heat polycarbonates and siloxane-polycarbonate block copolymers. Articles molded from these new thermoplastic compositions of high heat polycarbonates and siloxane-polycarbonate block copolymers exhibit improved low temperature ductility and thick section impact strength compared to articles molded from the high heat polycarbonates alone. These new thermoplastic compositions are also more resistant to cracking on thermal cycling and have a better retention of impact after thermal cycling as compared to the high heat polycarbonates alone.

SUMMARY OF THE INVENTION

The invention comprises a thermoplastic composition which comprises: (1) about 5 to about 50 weight percent of thermoplastic siloxane polycarbonate copolymer comprising (i) about 99 to about 50 weight percent of a repeating or recurring carbonate unit, based on the total weight of the siloxane polycarbonate block copolymer, of the formula:

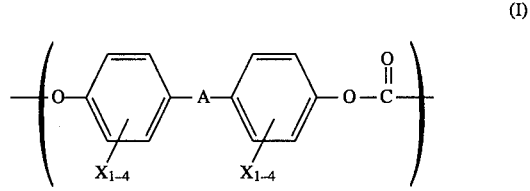

(I)

here A is a divalent hydrocarbon radical containing from 1 to about 15 carbon atoms; a substituted divalent hydrocarbon radical containing from 1 to about 15 carbon atoms and substituent groups such as halogen; —S—; —SS—; —S(O)—; —S(O)$_2$—; —O—; or —C—; each X is independently selected from the group consisting of hydrogen, halogen, and a monovalent hydrocarbon radical; and (ii) about 1 to about 50 weight percent of a repeating or recurring polysiloxane unit, based on the total weight of the terpolymer, of the formulae:

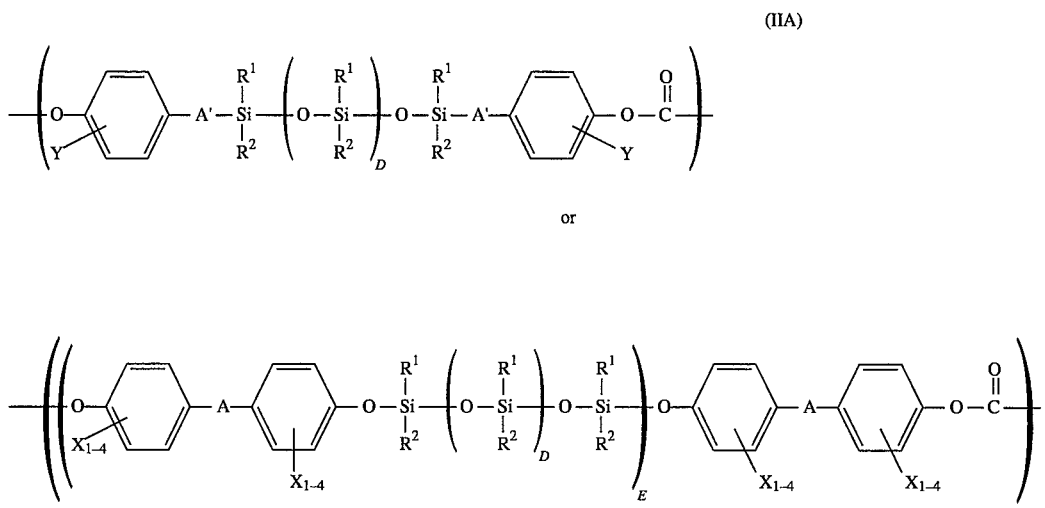

where $R^1$ and $R^2$ are each independently selected from hydrogen, hydrocarbyl, halogen-substituted hydrocarbyl ($R^1$ preferably is methyl and $R^2$ preferably is methyl or phenyl); A' is a straight or branched alkylene of 2 to 12 carbon atoms, preferably propylene; D is the average block length and is from about 10 to about 120, preferably about 10–70, and more preferably 40–60; Y is hydrogen, alkyl or alkoxy, preferably methoxy; A is as defined above; and E is the average oligomerization of the siloxane block and is from about 1 to about 10, preferably about 1 to about 5, and most preferably about 1 to about 3; and (2) about 95 to about 50 weight percent, based on the total weight of the thermoplastic composition, of a synthetic polymeric resin containing recurring or repeating polycarbonate units of the formula:

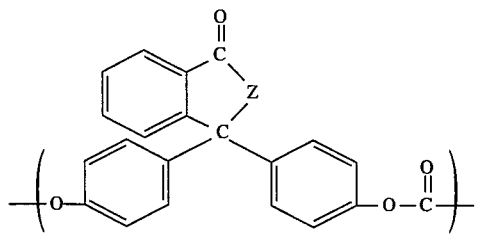

wherein Z is —O—, —N($R^3$)— or mixtures thereof, wherein $R^3$ is selected from hydrogen, hydrocarbyl and halogen-substituted hydrocarbyl, preferably methyl or butyl.

The term "hydrocarbyl" as used herein means the monovalent moiety obtained upon removal of a hydrogen atom from a parent hydrocarbon. Representative of hydrocarbyl are alkyl of 1 to 25 carbon atoms, inclusive such as methyl, ethyl, propyl, butyl, pentyl, hexyl, heptyl, octyl, nonyl, undecyl, decyl, dodecyl, octadecyl, nonodecyl eicosyl, heneicosyl, docosyl, tricosyl, tetracosyl, pentacosyl and the isomeric forms thereof; aryl of 6 to 25 carbon atoms, inclusive, such as phenyl, tolyl, xylyl, napthyl, biphenyl, tetraphenyl and the like; aralkyl of 7 to 25 carbon atoms, inclusive, such as benzyl, phenethyl, phenpropyl, phenbutyl, phenhexyl, napthoctyl and the like; cycloalkyl of 3 to 8 carbon atoms, inclusive, such as cyclopropyl, cyclobutyl, cyclopentyl, cyclohexyl, cycloheptyl, cyclooctyl and the like.

The term "halogen-substituted hydrocarbyl", as used herein means the hydrocarbyl moiety as previously defined wherein one or more hydrogen atoms have been replaced with a halogen atom.

The term "halogen" and "halide" are embracive of chlorine, bromine, iodine and fluorine; preferably chlorine and bromine.

With respect to A', the term "alkylene" means a divalent moiety and is illustrated by ethylene, propylene, isopropylene, 1,3-propylene, 1,4-butylene, 1,5-pentylene, hexamethylene, 1,8-octylene, 1,10-decylene and the like.

In a preferred embodiment the carbonate unit is a polyester-carbonate comprising recurring units of the formula:

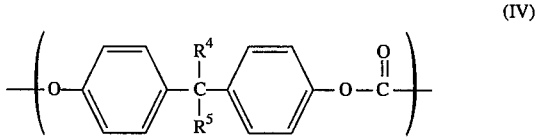

where $R^4$ and $R^5$ are each independently selected from hydrogen, hydrocarbyl and halogen-substituted hydrocarbyl; copolycondensed with 10 to 90 mole % of ester units, relative to the combined total carbonate and ester units of the siloxane polycarbonate block copolymer, of the formula:

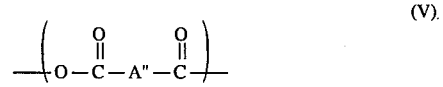

wherein A" is alkylene of about 6 to about 18 carbon atoms or phenylene and wherein the weight percentage of said polyester-carbonate blocks (i) is from about 99 to about 50%, preferably about 92 to about 96%, of the total weight of the siloxane polyester-carbonate block terpolymer, and the weight percentage of said polysiloxane blocks (ii) is from about 1 to 50%, preferably about 4 to about 8%, of the total weight percent of the siloxane polyester-carbonate block terpolymer.

DETAILED DESCRIPTION OF THE INVENTION

The following description presents embodiment compositions of the invention and the manner and process of conducting the process of the invention.

The thermoplastic block copolymer (1) may be formed by interfacial polymerization of a carbonate precursor such as phosgene with a dihydric phenol of the formula:

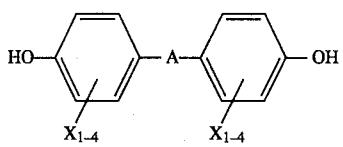

where A and X are as defined above; a siloxane of the formulae:

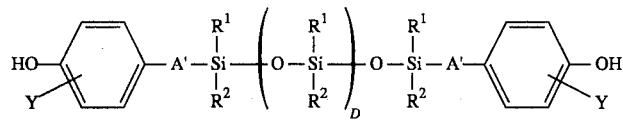

or

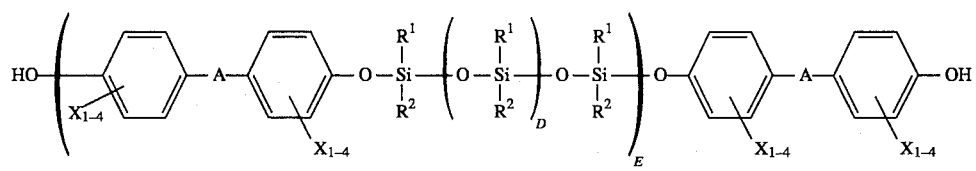

where $R^1$, $R^2$, D, Y, A', E, A and X are as defined above; and a chain length limiting amount of a monohydric phenol, preferably phenol itself. In a preferred embodiment $R^1$ is methyl and $R^2$ is methyl or phenyl.

The method of preparation of polycarbonates by interfacial polymerization are well known; see for example the details provided in the U.S. Pat. Nos. 3,028,365; 3,334,154; 3,275,601; 3,915,926; 3,030,331; 3,169,121; and 4,188,314, all of which are incorporated herein by reference thereto.

In general, the method of interfacial polymerization comprises the reaction of a dihydric phenol with a carbonyl halide (the carbonate precursor).

Although the reaction conditions of the preparative processes may vary, several of the preferred processes typically involve dissolving or dispersing the diphenol reactants in aqueous caustic soda or potash, adding the resulting mixture to a suitable water immiscible solvent medium and contacting the reactants with the carbonate precursor, such as phosgene, in the presence of a suitable catalyst such as triethyl amine and under controlled pH conditions, e.g., 8–12. The most commonly used water immiscible solvents include methylene chloride, 1,2-dichloroethane, chlorobenzene, toluene, and the like.

A catalyst may be employed to accelerate the rate of polymerization of the dihydric phenol reactant with the carbonate precursor. Representative catalysts include but are not limited to tertiary amines such as triethylamine, quaternary phosphonium compounds, quaternary ammonium compounds, and the like. The preferred process for preparing resins of the the invention comprises the phosgenation reaction. The temperature at which the phosgenation reaction proceeds may vary from below 0° C., to above 100° C. The phosgenation reaction preferably proceeds at temperatures of from room temperatures (25° C.) to 50° C. Since the reaction is exothermic, the rate of phosgene addition may be used to control the reaction temperature. The amount of phosgene required will generally depend upon the amount of the dihydric phenol reactant and the amount of dicarboxylic acid also present.

The process of the invention may be conducted without a chain limiting amount of a monohydric phenol chain stopper, but it is preferable that such an agent be present so that the molecular weight is controlled. Any monohydric phenol can be used, unsubstituted or with one or more substituents such as hydrocarbyl, hydrocarbyloxy or halogen, but the preferred monohydric phenols are phenol and p-cumyl phenol. The typical amount of monohydric phenol to result in the desired molecular weight (chain length) being in the desired range is about 0.5% to 5.0% by weight of bisphenol.

The preferred end groups for the terpolymers of the invention are aryloxy groups, especially phenoxy, optionally substituted by one or more hydrocarbyl, hydrocarbyloxy, and/or halogen substituents. Preferred endcapping phenols are phenol, p-tertiary butyl phenol, p-cumyl phenol, and the like. Special mention is made of p-cumyl phenol.

The dihydric phenols employed are known, and the reactive groups are the two phenolic hydroxyl groups. Some of the dihydric phenols are represented by the general formula:

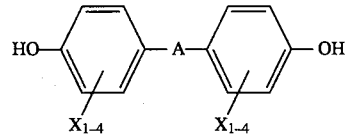

wherein A and X are as defined above.

Typical of some of the dihydric phenols that can be employed in the practice of the present invention are bisphenols such as (4-hydroxyphenyl)methane, 2,2-bis(4-hydroxyphenyl)propane (also known as bisphenol-A), 2,2-bis(4-hydroxy-3,5-dibromophenyl)propane; dihydric phenol ethers such as bis(4-hydroxyphenyl)ether, bis(3,5-dichloro-4-hydroxyphenyl)ether; dihydroxydiphenyls such as p,p'-dihydroxydiphenyl, 3,3'-dichloro-4,4'-dihydroxydiphenyl; dihydroxyarylsulfones such as bis(4-hydroxyphenyl)sulfone, bis(3,5-dimethyl-4-hydroxyphenyl)sulfone, dihydroxybenzenes such as resorcinol, hydroquinone, halo- and alkyl-substituted dihydroxybenzenes such as 1,4-dihydroxy-2,5-dichlorobenzene, 1,4-dihydroxy-3-methylbenzene; and dihydroxydiphenyl sulfides and sulfoxides such as bis(4-hydroxyphenyl)sulfide, bis(4-hydroxyphenyl)sulfoxide and bis(3,5-dibromo-4-hydroxyphenyl)sulfoxide. A variety of additional dihydric phenols are available and are disclosed in U.S. Pat. Nos. 2,999,835; 3,028,365 and 3,153,008; all of which are incorporated herein by reference. It is, of course possible to employ two or more different dihydric phenols or a combination of dihydric phenol with glycol.

The carbonate precursor can be either a carbonyl halide, a diarylcarbonate or a bishaloformate. The carbonyl halides include carbonyl bromide, carbonyl chloride and mixtures thereof. The bishaloformates include the bishaloformates of dihydric phenols such as bischloroformates of 2,2-bis(4-hydroxyphenyl)propane, 2,2-bis(4-hydroxy-3,5 dichlorophenyl)propane, hydroquinone, and the like, or bishaloformates of glycols such as bishaloformates of ethylene glycol, and the like. While all of the above carbonate precursors are useful, carbonyl chloride, also known as phosgene, is preferred.

Particularly preferred polysiloxane blocks are made from bisphenolpolysiloxanes, which may be prepared in accordance with the method described in U.S. Pat. No. 3,419,635. A preferred compound is readily provided by eugenol (2-methoxy-4-allylphenol) reacted to cap a hydrogen-terminated polysiloxane by an addition reaction advantageously catalyzed by platinum or its compounds. The essential features of the capping process are described by Vaughn, U.S. Pat. No. 3,419,635, which is incorporated by reference. For instance, the process is exemplified in example 8 of this Vaughn patent which describes the addition of a hydrogen-terminated polydimethylsiloxane to allylphenol in the presence of a catalytic amount of a platinum catalyst at an elevated temperature.

In a preferred embodiment of the invention the carbonate unit is a polyester-carbonate unit. The polyester-carbonate unit is prepared by reacting a bisphenol of the formula:

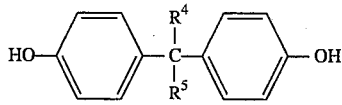

wherein $R^4$ and $R^5$ are as defined above with a dicarboxylic acid of the formula:

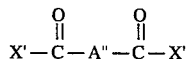

wherein A" is as defined above, preferably iso-phenylene, tere-phenylene, straight chain alpha-omega alkylene, such as hexamethylene or mixtures thereof and X' is hydroxy, chloro or bromo.

Examples of preferred $R^4$ and $R^5$ groups are hydrogen, methyl, ethyl, n-propyl, isopropyl, octyl, eicosyl, vinyl, cyclohexyl, phenyl, trifluoromethyl, chlorophenyl, benzyl, and pentabromophenyl. The most preferred $R^4$ and $R^5$ groups are methyl, thus the most preferred bisphenol is bisphenol A. Representative of other bisphenol are those listed in U.S. Pat. No. 4,994,532 (col. 3, lines 33–55) which is incorporated herein by reference thereto.

The dicarboxylic acid may be aromatic, straight or branched chain, saturated or unsaturated. For instance, the acid can be 2-octylsuccinic acid, dimethyladipic acid, or the like. However the preferred aliphatic dicarboxylic acids are those with a linear, saturated aliphatic chain, for instance suberic, azelaic, sebacic, undecanedioic, dodecanedioic, brassylic, pentadecanedioic, hexadecandioic, heptadecanedioic, octadecadioic, nonadecanedioic and eicosanedioic acids. It will be obvious to one skilled in the art that acids may not be present in the reaction mixture as the free acids but as corresponding salts, formed by reaction with the requisite base, although they could also be added as performed salts.

The amount of alkali to be used in the process of the invention is at least that amount needed to convert the dicarboxylic acid to its di salt and to neutralize the hydrochloric acid stoichiometrically produced by the reaction of the phosgene with the phenolic groups of the bisphenol and the phenolically-terminated siloxane, although an excess over this amount can be used. The alkali is conveniently an alkaline metal hydroxide, such as sodium, potassium, or lithium hydroxide, although soluble alkali carbonate can also be used. The preferred alkali is aqueous sodium hydroxide.

The process of the invention features the simultaneous formation and incorporation of the siloxane, and the polycarbonate segments into the copolymer product.

The products can be recovered from the reaction mixture in known ways. For example, the organic layer can be separated, washed with aqueous acid and water until neutral, then steam treated to precipitate the terpolymer which is recovered and dried.

The high heat polycarbonates (2) of the present invention are prepared by polymerizing dihydric monomers of the formula:

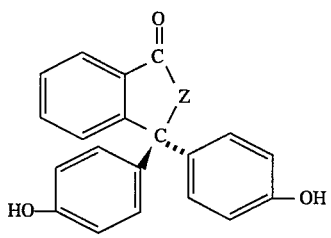

wherein Z is as defined above. Representative of the monomers are phenolphthalein, 2-methyl-3,3-bis(p-hydroxyphenyl)phthalimide, 2-butyl-3,3-bis(p-hydroxyphenyl)phthalimide, 2-octyl-3,3-bis(p-hydroxyphenyl)phthalimide, 2-phenyl-3,3-bis(p-hydroxyphenyl)phthalimide and the like. The 2-alkylphthalimide monomers are readily prepared by the reaction of a corresponding primary alkylamine with phenolphthalein using known and conventional methods; see for example the method of R. Albert, Ber., 26, 3077, (1893). Representative of the primary alkylamines are methylamine, ethylamine, propylamine, butylamine, pentylamine, hexylamine, heptylamine, octylamine, nonylamine, decylamine and the like. The 2-aryl phthalimide monomers are prepared by the reaction of a corresponding primary aryl amine and the aryl amine hydrochloride with phenolphthalein using known and conventional methods; see for example the method of M. S. Lin, B. J. Bulkin, and E. M. Pearce, J. Poly. Sci.,: Polym. Chem. Ed., 2773 (1981). Representative of the aryl amines are aniline 4-aminodiphenylmethane and 4-aminodiphenyl ether.

The high heat polycarbonates are polymerized by the well-known interfacial polymerization technique outlined above.

The high heat polycarbonates may be a homopolymer or may be copolymerized with other polymers such as the polycarbonate and polyester-carbonate units described above.

The thermoplastic compositions of the invention may be compounded with the addition of various types of additives known to the art of plastics compounding. Such additives can include for example fillers (such as clay or talc), reinforcing agents (such as glass fibers), impact modifiers, other resins, antistats, plasticizers, flow promoters and other processing aids, stabilizers, colorants, mold release agents, other flame retardants, ultraviolet screening agents, and the like.

DESCRIPTION OF THE PREFERRED EMBODIMENTS

The invention will be better understood with reference to the following examples, which are presented for purposes of illustration rather than for limitation, and set forth the best mode contemplated for carrying out the invention.

PREPARATION 1

Preparation of eugenol capped polydimethylsiloxane fluid with a degree of polymerization of about 10 siloxane units:

Octamethylcyclotetrasiloxane (8.3 kg, 28.0 moles), tetramethyldisiloxane (1.7 kg, 12.3 moles) and Filtrol 20 (172 g, 1% by weight, Harshaw/Filtrol Clay Products) were combined in a 12 L flask and heated to 45° C. for 2 hours. The temperature was raised to 100° C. and the mixture was rapidly agitated for 5 hours. The mixture was allowed to cool then filtered through a plug of Celite filtering aid. To the crude product was added a mixture of eugenol (3.9 kg, 23.6 moles) and Karstedt's platinum catalyst (3.0 g, 10 ppm Pt) at a rate of 40 g/minute. Reaction completion was monitored by the disappearance of the siloxane hydrogen in the FTIR spectrum. The reaction product was stripped of volatiles using a falling thin film evaporator operating at 200° C. and 1.5 torr. The isolated material was a light brown oil with a degree of polymerization of about 10 siloxane units. The material was used without further purification.

PREPARATION 2

Preparation of eugenol capped polydimethylsiloxane fluid with a degree of polymerization of about 50 siloxane units:

Octamethylcyclotetrasiloxane (8.3 kg, 28.0 moles), tetramethyldisiloxane (330 g, 2.46 moles) and Filtrol 20 (86 g, 1% by weight, Harshaw/Filtrol Clay Products) were combined in a 12 L flask and heated to 45° C. for 2 hours. The temperature was raised to 100° C. and the mixture was rapidly agitated for 5 hours. The mixture was allowed to cool then filtered through a plug of Celite filtering aid. To the crude product was added a mixture of eugenol (774 g, 4.72 moles) and Karstedt's platinum catalyst (1.57 g, 10 ppm Pt) at a rate of 40 g/minute. Reaction completion was monitored by the disappearance of the siloxane hydrogen in the FTIR spectrum. The reaction product was stripped of volatiles using a falling thin film evaporator operating at 200° C. and 1.5 torr. The isolated material was a light brown oil with a viscosity of 100 cstokes at 25° C. and a degree of polymerization of about 50 siloxane units. The material was used without further purification.

PREPARATION 3

Preparation of BPA [2,2-bis(4-hydroxyphenyl)propane] capped polydimethylsiloxane fluid with a degree of polymerization of about 10 siloxane units:

Octamethylcyclotetrasiloxane (591 g, 1.99 moles), dichlorodimethylsilane (114.4 g, 1 moles) and ferric chloride hexahydrate (0.66 g) were stirred at 50° C. for 8 hours. The dichlorosiloxane contained 7.82 wt % Cl and was used without further purification.

To a dry slurry of BPA (200.7 g, 0.879 moles) in 1.3 L of methylene chloride was added anhydrous ammonia until all the BPA dissolved. After the dissolution was complete, 350 grams of the dichloro siloxane was slowly added. The reaction was stirred for an additional hour. The solution was diluted with 600 mL of methylene chloride, washed twice with dilute aqueous HCl and three times with water. The BPA capped siloxane was not isolated, but was used without further purification.

PREPARATION 4

Preparation of a polysiloxane polycarbonate from an eugenol capped siloxane:

BPA (6.8 kg, 29.8 moles), the eugenol capped polydimethylsiloxane from Preparation 1 (35 kg, 2.89 moles), triethylamine (60 mL), phenol (112 g, 1.2 moles) and sodium gluconate (14 g) are combined with water (30 L) and dichloromethane (35 L) in a 100 L reactor. The biphasic mixture was stirred vigorously and brought to pH 10 by the addition of 50% aqueous sodium hydroxide solution. Phosgene (3.7 kg, 37.3 moles) was added over the course of 30 minutes with the reaction pH maintained in the range of 10 to 11. After purging the reaction mixture with nitrogen, additional dichloromethane (30 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The resin was isolated as white granules by steam precipitation from the dichloromethane solution. The material has about 20 weight percent siloxane with an average degree of polymerization in the siloxane block of about 10.

PREPARATION 5

Preparation of a polysiloxane polycarbonate from an eugenol capped siloxane:

BPA (90.7 kg, 398 moles), the eugenol capped polydimethylsiloxane from Preparation 2 (27.1 kg, 1.5 moles), triethylamine (1.1 L), phenol (1.4 kg, 14.9 moles) and sodium gluconate (150 g) are combined with water (200 L) and dichloromethane (250 L) in a 1000 L reactor. The mixture was stirred vigorously and brought to pH 10 by the addition of 50% aqueous sodium hydroxide solution. Phosgene (45.3 kg, 458 moles) was added over the course of 30 minutes with the reaction pH maintained in the range of 10 to 10.5. After purging the reaction mixture with nitrogen, additional dichloromethane (200 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The resin was isolated as white granules by steam precipitation from the dichloromethane solution. The material has about 20 weight percent siloxane with an average degree of polymerization in the siloxane block of about 50.

PREPARATION 6

Preparation of polysiloxane polycarbonate from a BPA capped siloxane:

BPA (544 g, 2.38 moles), methylene chloride solution containing the BPA capped polydimethylsiloxane from Preparation 3 (8.6 kg of solution containing 1.2 moles of siloxane), triethylamine (7 mL), phenol (2.95 g, 0.157 moles) and sodium gluconate (2.2 g) are combined with water (5.3 L) and dichloromethane (2 L) in a 30 L reactor. The mixture was stirred vigorously and brought to pH 9.5 by the addition of 50% aqueous sodium hydroxide solution. Phosgene (410 g, 4.1 moles) was added over the course of 10 minutes with the reaction pH maintained in the range of 9.0 to 11.0. After purging the reaction mixture with nitrogen, additional dichloromethane (8 L) was added and the organic phase was separated from the brine layer by liquid/liquid centrifugation. The organic phase was worked up by washing with 1% aqueous hydrochloric acid solution and water by means of phase to phase contact followed by liquid/liquid centrifuge separation. The resin was isolated as white granules by steam precipitation from the dichloromethane solution. The material has about 43 weight percent siloxane with an average degree of polymerization in the siloxane block of about 10.

PREPARATION 7

Preparation of 2-methyl-3,3-bis(p-hydroxyphenyl)phthalimide (22 Mole %)-BPA copolycarbonate:

A slurry of 1929 gms (8.449 moles) of BPA and 789.6 gms (2.383 moles) of 2-methyl-3,3-bis(p-hydroxyphenyl)phthalimide (MPP) in 9.0 L of methylene chloride and 7.7 L of water was phosgenated for 24 minutes at a rate of 40 gms/min. while maintaining the pH at 10.0 to 11.5 with aqueous sodium hydroxide. After the phosgenation was complete, p-cumylphenol (65.76 g, 0.3098 moles) was added and the mixture was stirred for 5 minutes at pH 10.0 to 10.5. Triethylamine (30mL) was added and the mixture was stirred at pH 10.0 for an additional 15 min. Then, phosgene was added for 5 minutes at 40 g/min. while the pH was maintained at pH 10.0 to 10.5. After the phosgenation was complete, the organic layer was separated and washed with dilute hydrochloric acid and water. The polymer was isolated by steam precipitation.

PREPARATION 8

Preparation of 2-methyl-3,3-bis(p-hydroxyphenyl)phthalimide (12 Mole %)-BPA copolycarbonate:

A slurry of 2260 gms (9.900 moles) of BPA and 447.4 gms (1.350 moles) of 2-methyl-3,3-bis(p-hydroxyphenyl)phthalimide (MPP) in 9.0 L of methylene chloride and 7.81 L of water was phosgenated for 30 minutes at a rate of 40 gms/min. while maintaining the pH at 10.0 to 10.5 with aqueous sodium hydroxide. After the phosgenation was complete, p-cumylphenol (71.65 g, 0.3375 moles) was added and the mixture was stirred for 5 minutes at pH 10.0 to 10.5. Triethylamine (31 mL) was added and the mixture was stirred at pH 10.0 for an additional 15 minutes. Then, phosgene was added for 5 minutes at 40 g/min. while the pH was maintained at pH 10.0 to 10.5. After the phosgenation was complete, the organic layer was separated and washed with dilute hydrochloric acid and water. The polymer was isolated by steam precipitation.

EXAMPLE 1

A thermoplastic composition according to the present invention is prepared by mixing the 12% MPP copolycarbonate composition of Preparation 8 (95 percent by weight based upon the total weight of the composition) and the BPA capped siloxane polycarbonate composition of Preparation 6 (5 percent by weight based upon the total weight of the composition) in a stainless steel can for about 5 minutes. The mixture is then extruded on a Werner and Pfleiderer 28 or 30 mm co-rotating twin screw extruder operating at 450° F. to 550° F. barrel temperature. Test specimens were prepared by injection molding at 570° F. melt temperature and 220° F. mold temperature.

The resulting composition is tested according to the procedures outlined below and the results are reported in Table 1.

The Heat Distortion Temperature Under Load (DTUL) of the molded composition is determined according to ASTM D-256.

Notched IZOD impact on 125 mil and 250 mil thick molded samples were determined according to ASTM D-256.

Dynatup Impact measurements were made in a Dynatup autoloader machine using 125 mil thick 10.16 cm discs. The tup impact velocity was 12.2 ft/sec giving an impact energy of 148 ft/lb. The average energy to maximum load of three measurements is reported.

Melt Volume Index (MVI) is determined by ASTM Test Method D-1238 at a temperature of 300° C. under the indicated load and reported as cc/10 min.

EXAMPLE 2

A thermoplastic composition, in accordance with the present invention, is prepared by mixing the 12% MPP copolycarbonate composition of Preparation 8 (90 percent by weight based upon the total weight of the composition) and the eugenol capped siloxane polycarbonate composition of Preparation 5 (10 percent by weight based upon the total weight of the composition) in a stainless steel can for about 5 minutes.

The resulting composition was extruded, molded and tested according to the procedures outlined in Example 1. The test results are reported in Table 1.

EXAMPLE 3

A thermoplastic composition, in accordance with the present invention, is prepared by mixing the 12% MPP copolycarbonate composition of Preparation 8 (80 percent by weight based upon the total weight of the composition) and the eugenol capped siloxane polycarbonate composition of Preparation 5 (20 percent by weight based upon the total weight of the composition) in a stainless steel can for about 5 minutes.

The resulting composition was extruded, molded and tested according to the procedures outlined in Example 1. The test results are reported in Table 1.

EXAMPLE 4

A thermoplastic composition, in accordance with the present invention, is prepared by mixing the 12% MPP copolycarbonate composition of Preparation 8 (80 percent by weight based upon the total weight of the composition) and the eugenol capped siloxane polycarbonate composition of Preparation 4 (20 percent by weight based upon the total weight of the composition) in a stainless steel can for about 5 minutes.

The resulting composition was extruded, molded and tested according to the procedures outlined in Example 1. The test results are reported in Table 1.

COMPARATIVE EXAMPLE 1

A thermoplastic composition, not in accordance with the present invention, is prepared by extruding and testing the 12% MPP copolycarbonate composition of Preparation 8 according to the procedures outlined in Example 1. The test results are reported in Table 1.

EXAMPLE 5

A thermoplastic composition, in accordance with the present invention, is prepared by mixing the 22% MPP copolycarbonate composition of Preparation 7 (95 percent by weight based upon the total weight of the composition) and the BPA capped siloxane polycarbonate composition of Preparation 6 (5 percent by weight based upon the total weight of the composition) in a stainless steel can for about 5 minutes.

The resulting composition was extruded, molded and tested according to the procedures outlined in Example 1. The test results are reported in Table 1.

EXAMPLE 6

A thermoplastic composition, in accordance with the present invention, is prepared by mixing the 22% MPP copolycarbonate composition of Preparation 7 (80 percent by weight based upon the total weight of the composition) and the eugenol capped siloxane polycarbonate composition of Preparation 5 (20 percent by weight based upon the total weight of the composition) in a stainless steel can for about 5 minutes.

The resulting composition was extruded, molded and tested according to the procedures outlined in Example 1. The test results are reported in Table 1.

COMPARATIVE EXAMPLE 2

A thermoplastic composition, not in accordance with the present invention, is prepared by extruding and testing the 22% MPP copolycarbonate composition of Preparation 7 according to the procedures outlined in Example 1. The test results are reported in Table 1.

present invention, Examples 1–6, exhibit better resistance to cracking after thermal cycling than articles prepared from thermoplastic compositions that do not contain a siloxane polycarbonate copolymer, Comparative Examples 1 and 2, and therefore are not in accordance with the present invention.

The results also show that articles prepared from the thermoplastic compositions prepared in accordance with the present invention, Examples 2, 3, 4 and 6 exhibit better low temperature ductility, better thick section impact strength and better retention of impact after thermal cycling than articles prepared from thermoplastic compositions that do not contain a siloxane polycarbonate copolymer, Comparative Examples 1 and 2, and therefore, are not in accordance with the present invention.

PREPARATION 9

Preparation of Phenolphthalein (22 Mole %)-BPA copolycarbonate:

A slurry of 1770 gms (7.752 moles) of BPA, 696.0 gms (2.186 moles) of phenolphthalein (PP), 73.84 gms (0.3480 moles) of p-cumylphenol and 27 mL of triethylamine in 8 L of methylene chloride and 7 L of water was phosgenated for 27 minutes at a rate of 40 gms/min. while maintaining the pH at 9.5 to 10.0 with aqueous sodium hydroxide. After the phosgenation was complete, the organic layer was separated and washed with dilute hydrochloric acid and water. The polymer was isolated by steam precipitation.

PREPARATION 10

Preparation of Phenolphthalein (35 Mole %)-BPA copolycarbonate:

A slurry of 1414 gms (6.195 moles) of BPA, 1062 gms (3.336 moles) of phenolphthalein (PP), 50.58 gms (0.2382

TABLE 1

| Example | 1 | 2 | 3 | 4 | Com. 1 | 5 | 6 | Com. 2 |
|---|---|---|---|---|---|---|---|---|
| MPP Copolymer | 95[a] | 90[a] | 80[a] | 80[a] | 100[a] | 95[b] | 80[b] | 100[b] |
| siloxane-PC | 5[c] | 10[d] | 20[d] | 20[e] | | 5[c] | 20[d] | |
| MVI (1.2 Kg) | | 2.3 | 2.3 | 3.1 | 2.0 | | 1.9 | 1.7 |
| DTUL 264° F. | | 291 | NA | 286 | 300 | | 3.08 | 320–325 |
| NOTCHED IZOD | | | | | | | | |
| RT | 11.7 | 11.2(100) | 10.9(100) | 10.6(100) | 10.5(100) | 5.1 | 7.5(100) | 5.5–7.0(0) |
| 0° C. | 8.3 | 9.0(100) | 9.1(100) | 9.5(100) | 9.0 | 4.0 | 5.6(0) | 4.1(0) |
| −10° C. | 6.4 | 6.8(0) | 8.2(80) | 9.8(100) | 5.7(0) | 4.2 | 5.3(0) | |
| −20° C. | 4.7 | | 6.4(40) | | | 2.9 | 5.0(0) | |
| −30° C. | 5.4 | 6.0(0) | 6.0(20) | 5.8(10) | | 3.2 | 4.7(0) | 2.6(0) |
| 250 mil IZOD | | 5.4(0) | 7.2(100) | 7.3(100) | 2.8(0) | | 5.1(100) | 2.0(0) |
| DYNATUP | | | | | | | | |
| RT | | 36.8(100) | | 34.5(100) | 38.4(100) | | 26.9(100) | 38.8(100) |
| −30° C. | | 29.6(33) | | 24.6(100) | | | | |
| % Bars Cracked after four (4) Thermal Cycles[f] | | 0 | 0 | 0 | 0 | 0 | 0 | 100 |
| Notched IZOD after Thermal Cycling (RT) | | 9.5(100) | 9.0(100) | 7.7(100) | 2.7(0) | 2.3(0) | 6.7(100) | 2.6(0) |

[a] = 12 Mol % MPP of Preparation 8
[b] = 22 Mol % MPP of Preparation 7
[c] = siloxane-PC of Preparation 6
[d] = siloxane-PC of Preparation 5
[e] = siloxane-PC of Preparation 4
[f] = each thermal cycle consisted of placing the bars in a freezer at −40° C. for 2 hrs then an oven at 140° C. for 2 hrs.
( ) = % ductile [bars exhibiting yielding at break]

The results of Table 1 show that articles prepared from the thermoplastic compositions prepared in accordance with the moles) of p-cumylphenol and 27 mL of triethylamine in 8 L of methylene chloride and 7 L of water was phosgenated for 27 minutes at a rate of 40 gms/min. while maintaining the pH at 9.5 to 10.0 with aqueous sodium hydroxide. After the phosgenation was complete, the organic layer was separated and washed with dilute hydrochloric acid and water. The polymer was isolated by steam precipitation.

EXAMPLE 7

A thermoplastic composition, in accordance with the present invention, is prepared by mixing the 22% PP copolycarbonate composition of Preparation 9 (80 percent by weight based upon the total weight of the composition) and the eugenol capped siloxane polycarbonate composition of Preparation 5 (20 percent by weight based upon the total weight of the composition) in a stainless steel can for about 5 minutes.

The resulting composition is processed and extruded according to the procedure outlined in Example 1 and tested according to the procedures outlined below. The test results are reported in Table 2.

The Heat Distortion Temperature Under Load (DTUL) of the molded composition is determined according to ASTM D-256.

Notched IZOD impact on 125 mil and 250 mil thick molded samples were determined according to ASTM D-256.

Dynatup Impact measurements were made in a Dynatup autoloader machine using 125 mil thick 10.16 cm discs. The tup impact velocity was 12.2 ft/sec giving an impact energy of 148 ft/lb. The average energy to maximum load of three measurements is reported.

Melt Volume Index (MVI) is determined by ASTM Test Method D-1238 at a temperature of 300° C. under the indicated load and reported as cc/10 min.

The weight average molecular weight was determined by gel permeation chromatography in methylene chloride relative to polycarbonate standards using a UV detector at 254 nm.

EXAMPLE 8

A thermoplastic composition, in accordance with the present invention, is prepared by mixing the 35% PP copolycarbonate composition of Preparation 10 (80 percent by weight based upon the total weight of the composition) and the eugenol capped siloxane polycarbonate composition of Preparation 5 (20 percent by weight based upon the total weight of the composition) in a stainless steel can for about 5 minutes.

The resulting composition was extruded, molded and tested according to the procedures outlined in Example 7. The test results are reported in Table 2.

COMPARATIVE EXAMPLE 3

A thermoplastic composition, not in accordance with the present invention, is prepared by extruding and testing the 22% PP copolycarbonate composition of Preparation 9 according to the procedures outlined in Example 7. The test results are reported in Table 2.

COMPARATIVE EXAMPLE 4

A thermoplastic composition, not in accordance with the present invention, is prepared by extruding and testing the 22% PP copolycarbonate composition of Preparation 9 (using 63.29 g of p-cumylphenol instead of 73.84 g) according to the procedures outlined in Example 7. The test results are reported in Table 2.

COMPARATIVE EXAMPLE 5

A thermoplastic composition, not in accordance with the present invention, is prepared by extruding and testing the 22% PP copolycarbonate composition of Preparation 9 (using 52.74 g of p-cumylphenol instead of 73.84 g) according to the procedures outlined in Example 7. The test results are reported in Table 2.

COMPARATIVE EXAMPLE 6

A thermoplastic composition, not in accordance with the present invention, is prepared by extruding and testing the 35% PP copolycarbonate composition of Preparation 10 (using 70.82 g of p-cumylphenol instead of 50.58 g) according to the procedures outlined in Example 7. The test results are reported in Table 2.

COMPARATIVE EXAMPLE 7

A thermoplastic composition, not in accordance with the present invention, is prepared by extruding and testing the 35% PP copolycarbonate composition of Preparation 10 (using 60.70 g of p-cumylphenol instead of 50.58 g) according to the procedures outlined in Example 7. The test results are reported in Table 2.

COMPARATIVE EXAMPLE 8

A thermoplastic composition, not in accordance with the present invention, is prepared by extruding and testing the 35% PP copolycarbonate composition of Preparation 10 according to the procedures outlined in Example 7. The test results are reported in Table 2.

TABLE 2

| Example* | 7 | 8 | Com. 3 | Com. 4 | Com. 5 | Com. 6 | Com. 7 | Com. 8 |
|---|---|---|---|---|---|---|---|---|
| PP Copolymer | 80$^a$ | 80$^b$ | 100$^a$ | 100$^a$ | 100$^a$ | 100$^b$ | 100$^b$ | 100$^b$ |
| Siloxane-PC$^c$ | 20 | 20 | | | | | | |
| Molecular WT$^d$ | 28,300 | 25,700 | 24,900 | 28,900 | 31,200 | 23,900 | 25,100 | 26,100 |
| MVI (300° C., 6.1 Kg) | 15.6 | 16.7 | 18.7 | 10.3 | 7.0 | 13.1 | 8.7 | 5.2 |
| HDT (°F.) at 264 PSI | 297 | 315 | 307 | 313 | 315 | 332 | 332 | 334 |
| Notched IZOD | | | | | | | | |
| RT | 9.5(100) | 6.8(100) | 7.6(100) | 9.8(100) | 9.4(100) | 4.3(0) | 5.6(0) | 5.6(0) |
| 0° C. | 8.7(100) | 5.0(40) | 7.3(60) | 8.4(80) | 6.3(0) | 4.1(0) | 3.2(0) | 2.5(0) |
| −10° C. | 8.6(100) | 4.9(20) | 2.3(0) | 4.4(25)$^f$ | 5.5(0) | 4.1(0) | 2.8(0) | 2.4(0) |
| −30° C. | 6.3(100) | 4.1(0) | 1.9(0) | 2.2(0) | 3.0(0) | 2.2(0) | 2.0(0) | 1.4(0) |
| Notched IZOD 250 mil | 6.4(100) | 4.8(100) | 2.1(0) | 2.4(0) | 2.7(0) | 2.1(0) | 2.8(0) | 2.7(0) |

TABLE 2-continued

| Example* | 7 | 8 | Com. 3 | Com. 4 | Com. 5 | Com. 6 | Com. 7 | Com. 8 |
|---|---|---|---|---|---|---|---|---|
| Dynatup % Bars Cracked after Thermal Cycle[e] | 33(100) | 29(100) | 45.4(100) | 40.4(100) | 37.5(66) | 30.1(0) | 34.4(50) | 39.6(66) |
| cycle 1 | 0 | 0 | 100 | 100 | 100 | 100 | 100 | 100 |
| cycle 2 | 0 | 0 | 100 | 100 | 100 | 100 | 100 | 100 |
| cycle 3 | 0 | 0 | 100 | 100 | 100 | 100 | 100 | 100 |
| cycle 4 | 40 | 100 | 100 | 100 | 100 | 100 | 100 | 100 |
| Notched IZOD after Thermal Cycling (RT) | 8.6(100) | 6.4(100) | 1.7(0) | 2.3(0) | 3.9(0) | 3.2(0) | 3.0(0) | 1.9(0) |

*All blends contained 0.05 phr of Irgaphos 168
[a] = 22 Mol % PP of Preparation 9
[b] = 35 Mol % PP of Preparation 10
[c] = siloxane-PC of Preparation 5
[d] = molecular weight of phenolphthalein copolymer
[e] = thermal cycle as described in Table 1, five bars tested
[f] = only four bars tested
( ) = % of ductile failure The results of Table 2 show that articles prepared from the thermoplastic compositions prepared in accordance with the present invention, Examples 7 and 8, exhibit better low temperature ductility, better thick section impact, better resistance to cracking after thermal cycling and better retention of impact after thermal cycling than articles prepared from thermoplastic compositions that do not contain a siloxane polycarbonate copolymer, Comparative Examples 3–8, and therefore, are not in accordance with the present invention.

The above mentioned patents, applications, publications, and test methods are incorporated herein by reference.

Many variations in the present invention will suggest themselves to those skilled in this art in light of the above, detailed description. For example, two siloxane blocks of different degrees of polymerization could be mixed and used. Instead of iso- and terephthaloyldichloride, there can be used 2-6-naphthaloyl dibromide. Instead of cumyl phenol as a molecular weight modifier, phenol can be used. All such obvious modifications are within the full intended scope of the appended claims.

What is claimed is:

1. A thermoplastic composition which comprises:
   (1) about 5 to 50 weight percent, based on the total weight of the thermoplastic composition, of a thermoplastic siloxane polyester-carbonate block-terpolymer comprising
   (i) a polyester-carbonate copolymer comprising recurring units of the formula:

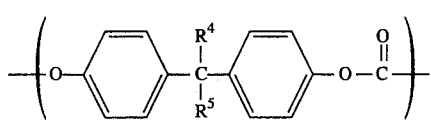

(IV)

where $R^4$ and $R^5$ are each independently selected from hydrogen, hydrocarbyl and halogen-substituted hydrocarbyl; copolycondensed with 10 to 90 mole % of ester units, relative to the combined total carbonate and ester units of the polyester-carbonate copolymer blocks, of the formula:

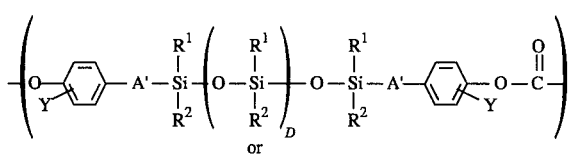

(V)

wherein A" is alkylene of about 6 to about 18 carbon atoms or phenylene; and
   (ii) a repeating or recurring polysiloxane unit of the formula selected from

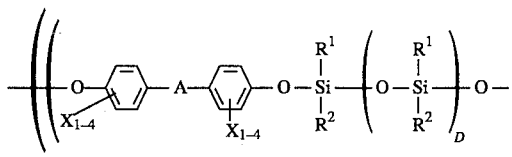

(IIA)

or

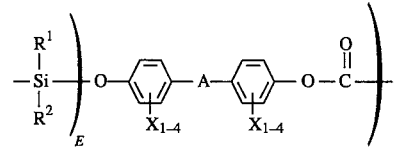

(IIB)

where $R^1$ and $R^2$ are each independently selected from hydrogen, hydrocarbyl and halogen-substituted hydrocarbyl, A' is a straight or branched alkylene of 2 to 12 carbon atoms, D is an integer of from about 10 to about 120, Y is selected from hydrogen, hydrocarbyl, hydrocarbyloxy and halogen, E is an integer of from about 1 to about 10 and A and X are as defined above and wherein the weight percentage of said polyestercarbonate copolymer blocks (i) is from about 99 to about 50% of the total weight of the siloxane polyester-carbonate block terpolymer, and the weight percentage of said polysiloxane blocks (ii) is from about 1 to 50% of the total weight percent of the siloxane polyester-carbonate block terpolymer; and (2) about 95 to about 50 weight percent, based on the total weight of the thermoplastic composition, of a synthetic polymeric resin containing recurring or repeating polycarbonate units of the formula:

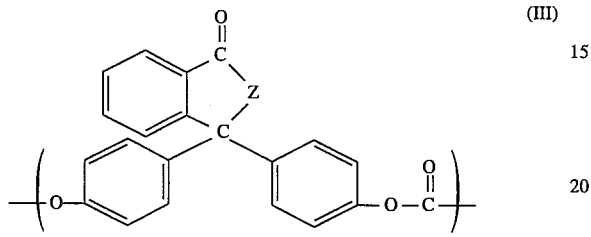
(III)

wherein Z is —O—, —N(R³)— or a mixture thereof and R³ is selected from hydrogen, hydrocarbyl and halogen-substituted hydrocarbyl.

2. A thermoplastic composition as defined in claim 1 wherein $R^4$ and $R^5$ are methyl.

3. A thermoplastic composition as defined in claim 1 wherein A" comprises iso-phenylene, tere-phenylene, or a mixture thereof.

4. A thermoplastic composition as defined in claim 1 wherein A" is a straight chain alpha-omega alkylene.

5. A thermoplastic composition as defined in claim 1 wherein A" is hexamethylene.

6. A thermoplastic composition as defined in claim 1 wherein the weight percentage of said polyester-carbonate blocks (i) is from about 96 to about 92% of the total weight of the siloxane polyester-carbonate block copolymer, and the weight percentage of said polysiloxane blocks (ii) is from about 4 to 8% of the total weight percent of the siloxane polyester-carbonate block copolymer.

7. A thermoplastic composition having high heat resistance, high ductile impact strength at temperatures of –30° C. and resistance to cracking on thermal cycling, said composition consisting essentially of:

(1) about 5 to 50 weight percent of a thermoplastic siloxane polyester-carbonate block terpolymer comprising
(i) about 99 to about 50 weight percent of a repeating or recurring carbonate units, based on the total weight of the siloxane polyester-carbonate block terpolymer, of the formula:

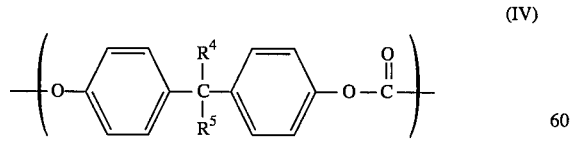
(IV)

where $R^4$ and $R^5$ are each independently selected from hydrogen, hydrocarbyl and halogen-substituted hydrocarbyl, copolycondensed with 10 to 90 mole % of ester units, relative to the combined total carbonate and ester units of the polyester-carbonate block copolymer, of the formula:

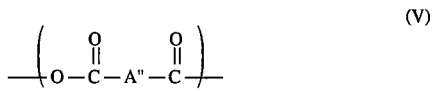
(V)

wherein A" is alkylene of about 6 to about 18 carbon atoms or phenylene; and (ii) about 1 to about 50 weight percent of a repeating or recurring polysiloxane units, based on the total weight of the siloxane polyester-carbonate block terpolymer, of the formula:

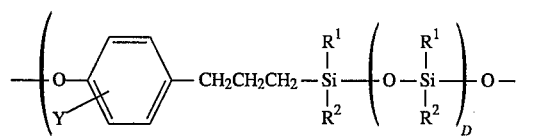

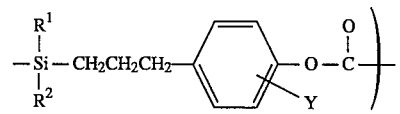

where $R^1$ and $R^2$ are each independently selected from hydrogen, hydrocarbyl and halogen-substituted hydrocarbyl, D is an integer of from about 10 to about 120, and Y is selected from hydrogen, hydrocarbyl, hydrocarbyloxy and halogen; and (2) about 95 to about 50 weight percent, based on the weight of the thermoplastic composition, of a synthetic polymeric resin containing recurring or repeating polycarbonate units of the formula:

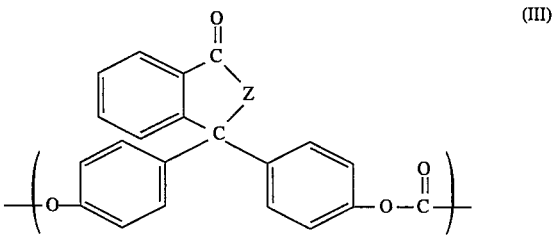
(III)

wherein Z is —O—, —N(R³)—, or a mixture thereof and R³ is selected from hydrogen, hydrocarbyl and halogen-substituted hydrocarbyl.

8. A thermoplastic composition as defined in claim 7 wherein R³ is hydrogen or alkyl of 1–4 carbon atoms.

9. A thermoplastic composition as defined in claim 8 wherein R³ is methyl.

10. A thermoplastic composition as defined in claim 8 wherein R³ is butyl.

11. A thermoplastic composition as defined in claim 7 wherein $R^1$, $R^2$, $R^4$ and $R^5$ are methyl, Y is methoxy and A" is hexamethylene or phenylene.

* * * * *